May 2, 1939. L. A. HYLAND 2,156,534
ELECTRIC DISCHARGE DEVICE CIRCUITS
Filed Nov. 13, 1935
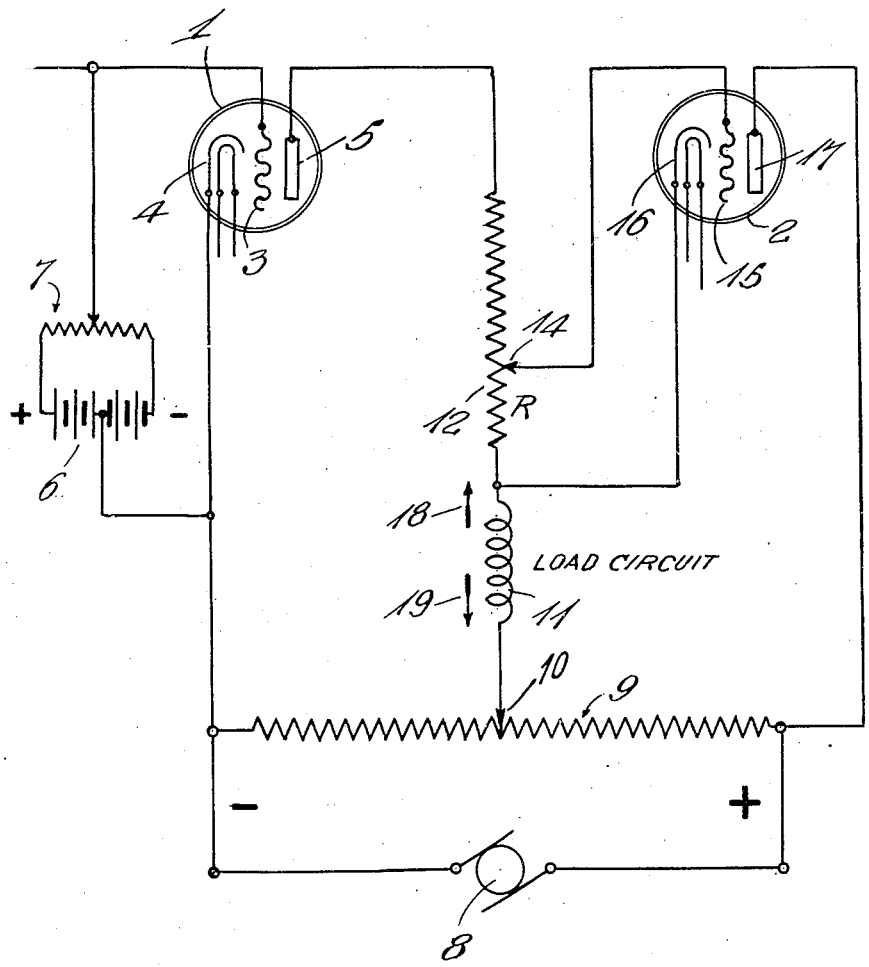
INVENTOR.
Lawrence A. Hyland
BY
Ben J. Chromy
ATTORNEY.

Patented May 2, 1939

2,156,534

UNITED STATES PATENT OFFICE 2,156,534

ELECTRIC DISCHARGE DEVICE CIRCUITS

Lawrence A. Hyland, Washington, D. C., assignor, by mesne assignments, to Bendix Radio Corporation, New York, N. Y., a corporation of Delaware Application November 13, 1935, Serial No. 49,598

10 Claims. (Cl. 250—27)

This invention relates to control circuits employing electric discharge devices. More particularly this invention relates to control circuits employing electric discharge devices for controlling the intensity as well as the direction of flow of an electric current or electric currents.

An object of this invention is to provide a circuit arrangement employing an electric discharge device means for controlling the magnitude of an electric current and reversing the direction of flow of said current at will. Another object of this invention is to provide a circuit arrangement employing electric discharge devices for increasing or decreasing the magnitude of current flow through a load circuit to obtain any desired current wave-form in said load circuit.

Still another object of this invention is to provide a control circuit arrangement employing electric discharge device means for increasing or decreasing the magnitude of current flow through a load circuit uniformly or in any desired increments.

Still a further object of this invention is to provide a control circuit arrangement employing electric discharge devices in which electric currents of any predetermined values, adapted to be conducted by said electric discharge device means, may be varied from infinitesimal to full load values and the direction of flow thereof reversed at will.

Other and further objects of this invention will be apparent to those skilled in the art to which it relates from the following specification and the claims.

In accordance with this invention I provide a circuit arrangement employing a pair of electric discharge device paths for controlling the magnitude and direction of current flow through a predetermined load circuit. The electric discharge device paths may be made up of a pair of electric discharge devices, each having a grid electrode, a cathode and an anode. Various types of discharge devices having a plurality of grid-like electrodes may be employed to advantage, particularly where flexible control with electric currents of substantial magnitude is desired. These discharge devices may be either of the vacuum type or of the gas content type, and where the gas content type of device is employed, the gas may include any of the inert gases or it may include vapors of materials, such as, mercury.

The discharge device paths are connected in such a way that when one of the paths is conducting a current through the load circuit, that current may be made to flow in one direction, and when the other of the electric discharge device paths is conducting the load circuit current, it flows in the opposite direction.

The magnitude of the current flowing through the load circuit as well as the direction thereof may be controlled by controlling the conductivity of the electric discharge device paths employed.

The control circuit of my invention may be employed in controlling the current for various devices, such as, the field windings of electric motors and generators. The circuit arrangement of my invention also may be employed for operating remote control circuits in which flexibility of control is desired.

Various features of this invention will be apparent from the following specification and the drawing in which the sole figure illustrates an embodiment of the invention.

Referring to the drawing in detail, reference numeral 1 designates an electric discharge device having a grid electrode 3, a cathode 4 and an anode 5. The cathode 4 may be of the directly heated type or an indirectly heated type, and where desired, the cathode may be associated with or composed of a suitable pool of mercury. The grid electrode 3 is connected to a suitable source of current supply adapted to control the conductivity of the device 1. This source of current supply may be a small generator of direct or alternating current, a battery or a suitable rectifier. Where a battery 6 or some other source of direct current supply is employed, a potentiometer 7 is used to vary the magnitude of the grid potential impressed upon the grid electrode of the device 1. By shifting the position of the variable contact of the potentiometer 7, the magnitude of the potential impressed upon the grid electrode 3 with respect to the cathode 4 may be varied from a positive value to a negative value, at will, and the device is caused either to conduct an electric current between the cathode 4 and the anode 5 or to block the passage of an electric current between said cathode and said anode.

A source of current supply 8, which may be either a generator, a battery, or a rectified current source, is connected across the voltage divider resistance 9 having a variable contact 10. The voltage divider 9 is used for the purpose of obtaining the proper anode potential for the discharge devices 1 and 2, and where a battery or a pair of generators, connected in series, is employed, as the current supply source 8, this voltage divider may be eliminated, and the contact 10 connected to a suitable terminal or terminals of the battery or between the series-connected generators. The variable contact 10 is connected to the load circuit 11 which may be the field winding of a motor or generator which it is desired to control. A pair of resistance units 12 and 13 is connected in series between the load circuit 11 and the anode 5 of the device 1.

The cathode 16 of the discharge device 2 is connected to the load circuit 11 and the resistor 12. The grid electrode 15 is connected to the variable contact 14 of the resistance unit 12 for the purpose of facilitating adjustment of the potential of the grid electrode 15 to any desired operating value with respect to the cathode 16. The anode 17 of the discharge device 2 is connected to the positive terminal of the voltage divider 9. It is, of course, obvious that a second variable contact may be provided to the voltage divider 9 at or adjacent to the positive terminal thereof and the anode 17 connected to this second variable contact.

The operation of the circuit arrangement of this invention is as follows: When a suitable grid bias potential is impressed upon the grid electrode 3 of the tube 1 to permit this tube to conduct a current between the cathode 4 and the anode 5, the load circuit 11 will be energized in one direction, that is, the current from the source of supply 8 will flow through the element 11, the resistor 12 and the anode-cathode circuit of the tube 1 in the direction indicated, for example, by the arrow 18. The current flowing through the resistor 12, corresponding substantially to the current flowing in the anode-cathode circuit of tube 1, causes a certain potential drop across this resistance. Thus, there is impressed upon the grid electrode 15 of the discharge device 2 a certain potential, depending upon the position of the contact 14 on the resistor 12. This grid potential is of such a magnitude as to cause the electric discharge device 2 to be substantially non-conductive.

When the device 1 is blocked by impressing upon the grid electrode thereof a potential sufficient to render this device non-conductive, substantially no current flows through the anode-cathode circuit thereof. Consequently, practically no current flows through the resistor 12 and the grid blocking potential, impressed upon the grid 15 when the tube 1 was conducting an electric current through its anode-cathode circuit, is reduced or changed sufficiently to render the discharge device 2 conductive. The discharge device 2 passes a current between its anode and cathode from the source of current supply 8. This current also flows through the load circuit 11. However, in this case, the direction of current flow through the load circuit 11 is in the direction indicated by the arrow 19, for example, which is the reverse direction from that in which the current passed by the discharge device 1 was caused to flow through this load circuit.

It will be observed that both of the discharge devices 1 and 2 may be rendered conductive at the same time under certain conditions when the grid bias potentials thereof are of the proper values simultaneously and in those cases the greater of the two currents will predominate in the load circuit 11.

Under certain conditions one of the tubes, for instance, tube 1, may conduct a current throughout the cycle of grid voltage change and the current flowing through the tube 2 may be great enough at its maximum value only to neutralize or reduce the current drawn through the load circuit 11 by the tube 1. The current through the load circuit 11 is thus varied between a maximum value in one direction and a certain minimum value in the same direction or zero value and does not necessarily reverse in direction. In this manner the current through the load circuit can be controlled to be of practically any value within certain limits and extremely accurate and fine adjustments in current values may be obtained.

Furthermore, if the current through the load 11 is actually reversed the maximum value in the opposite direction may be made materially less than the maximum value in the first direction by properly adjusting the bias potentials on the tubes 1 and 2.

In addition to obtaining its grid bias from the resistor 12, the discharge device 2 may have an auxiliary source of grid bias potential connected in the circuit of the cathode 16. Where desired this source of bias potential may be connected with its positive terminal to the resistor 12 and the negative terminal to the cathode 16. In this way the potential drop across the portion of resistor 12, applied to the tube 2 as grid bias, is used to neutralize the effect of the additional bias potential connected to the cathode. This source of bias potential may be connected with the negative terminal thereof to the resistor 12 and the positive terminal to the cathode 16 if desired, where tubes which conduct current even when the grid potential is negative, are employed.

Specific applications of this device of my invention are: (1) where the load circuit is a relay for controlling various functions, such as, recording apparatus for high speed telegraphy, (2) where the load circuit is a field coil of a generator employed for purposes of voltage regulation. Where the voltage regulating field of a generator is energized as the load circuit in accordance with this invention, the field current through this regulating winding can be controlled between very wide limits. For example, currents of large values flowing in one direction, gradually decreased to zero and then reversed to flow in the opposite direction, may be used, resulting in easy, gradual and accurate control. Other uses for this invention will be apparent from the foregoing description thereof.

Various modified forms of this invention may be made without parting from the spirit and scope thereof and therefore I do not desire to limit this invention to the exact details described except insofar as these details may be defined by the following claims.

What I claim and desire to secure by Letters Patent of the United States is as follows:

1. An electric discharge device circuit arrangement adapted to control the magnitude and direction of current flow through a load circuit, comprising a pair of electric discharge devices each having a control electrode, a cathode and an anode, a source of current supply, connections between one terminal of said source of current supply and the cathode of one of said discharge devices, connections between the other terminal of said source of current supply and the anode of the other of said discharge devices, a load circuit connected in series with the anode of said first mentioned discharge device the cathode of said second mentioned discharge device and said source of current supply, means for controlling the grid potential of said second mentioned discharge device in accordance with the anode current of the first mentioned discharge device and means for controlling the anode-cathode conductivity of the first-mentioned discharge device.

2. An electric circuit arrangement adapted to control the magnitude and direction of current flow through a load circuit, comprising a source of current supply, a pair of conducting paths connected across different sections of said source of current supply, said conducting paths having a common connection to said source of current supply, said common connection including said load circuit, means for causing one of said paths to pass current through said load circuit in one direction and means for causing the other of said paths to pass current through said load circuit in the reverse direction when said first path is substantially non-conductive.

3. An electric circuit arrangement adapted to control the magnitude and direction of current flow through a load circuit comprising a source of direct current supply, a load circuit connected to said source of current supply, electric discharge device means connected to control the current flow through said load circuit in one direction, means for blocking the current flow through said electric discharge device means and said load circuit in said first direction and electric discharge device means for simultaneously initiating a current flow through said load circuit in the opposite direction.

4. An electric discharge device circuit arrangement adapted to control the magnitude and direction of current flow through a load circuit, comprising a source of unidirectional current supply, voltage dividing means connected across said source of current supply, a pair of electric discharge devices of variable and controllable conductivity connected across sections of said voltage dividing means through a load circuit, and means connected to said electric discharge devices for controlling the magnitude and direction of the current flowing through said load circuit.

5. An electric discharge device circuit arrangement adapted to control the magnitude and direction of current flow through a load circuit, comprising a first electric discharge device and a second electric discharge device, each of said devices including a cathode and an anode, a unidirectional current supply source, a voltage divider connected across said current supply source, connections for connecting the anode of said first discharge device to a point on said voltage divider intermediate the terminals thereof through said load circuit, connections for connecting the anode of said second electric discharge device to a point on said voltage divider which is substantially more positive than said intermediate point, means for controlling the conductivity of said first electric discharge device for controlling the load circuit current and means for controlling the conductivity of the other of said discharge paths to reverse the current in said load circuit.

6. An electric discharge device circuit arrangement adapted to control the magnitude and direction of current flow through a load circuit, comprising a unidirectional current supply source, voltage dividing means connected across said current supply source, an electric discharge device connected across a portion of said voltage dividing means through a load circuit, means for varying the conductivity of said electric discharge device for controlling the magnitude of the current flow through said load circuit and means connected to said electric discharge device, said load circuit and said voltage dividing means for reversing the direction of current flow through said load circuit when the current flow through said electric discharge device reaches low values.

7. An electric discharge device circuit adapted to control the magnitude and direction of current flow through a load circuit, comprising a unidirectional source of current supply, an electric discharge device having cathode, anode, and grid electrodes, means for impressing part of the potential produced by said source of current supply across the cathode-anode path of said discharge device, a resistance and a load circuit connected between the anode of said discharge device and said source of current supply, a second electric discharge device having cathode, anode, and grid electrodes, means for connecting said grid electrode and cathode of said second discharge device across a section of said resistance for controlling the conductivity of said second discharge device in accordance with the potential drop across said resistance, and means for connecting the anode of said second discharge device to the positive terminal of said source of current supply.

8. An electric discharge device circuit adapted to control the magnitude and direction of current flow through a load circuit, comprising a unidirectional source of current supply, an electric discharge device having cathode, anode, and grid electrodes, a voltage divider for impressing part of the potential produced by said source of current supply across the cathode-anode path of said discharge device, a resistance and a load circuit connected between the anode of said discharge device and said voltage divider, a second electric discharge device having cathode, anode, and grid electrodes, means for connecting said grid electrode and cathode of said second discharge device across a section of said resistance for controlling the conductivity of said second discharge device in accordance with the potential drop across said resistance, and means for connecting the anode of said second discharge device to the positive terminal of said source of current supply, said second discharge device being adapted to control the flow of current through said load circuit in the reverse direction from the current controlled by said first electric discharge device.

9. An electric discharge device circuit for controlling the direction of current flow through a load circuit, a first discharge device having an anode, a cathode, and a control grid, means for biasing said control grid, a second discharge device having an anode, a cathode, and a control grid, means for biasing the last-named control grid, a source of current for energizing said anodes and a load device in circuit with said anodes and being connected in series with the anode of said first discharge device and the means for biasing the grid of said second discharge device.

10. An electric discharge device circuit for controlling the direction of current flow through a load device, comprising a discharge device having an anode, a cathode, and a control grid, a source of anode current for said anode, a load device connected in circuit with said source and said anode, a second electric discharge device having an anode, a cathode, and a control grid, said second anode being connected to said source of current, and means for biasing the grid of said second discharge device, said means being in series with the anode of said first discharge device.

LAWRENCE A. HYLAND.